(12) United States Patent
Allison et al.

(10) Patent No.: US 7,063,183 B2
(45) Date of Patent: Jun. 20, 2006

(54) APPARATUS AND METHODS OF FORMING SOUND ATTENUATING LAMINATES HAVING FIBER AND MASS LAYERS

(75) Inventors: Timothy J. Allison, Old Fort, NC (US); Carroll Owenby, Old Fort, NC (US); Bill Griffin, Indian Trail, NC (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/378,216

(22) Filed: Mar. 3, 2003

(65) Prior Publication Data
US 2004/0079583 A1 Apr. 29, 2004

Related U.S. Application Data
(60) Provisional application No. 60/421,914, filed on Oct. 29, 2002.

(51) Int. Cl.
*E04B 1/82* (2006.01)
*B29C 65/02* (2006.01)
*B29C 65/18* (2006.01)
*B32B 31/20* (2006.01)

(52) U.S. Cl. .................... 181/290; 181/296; 156/304.6; 156/309.9; 264/492

(58) Field of Classification Search ................ 181/290, 181/295, 296, 284, 204, 205; 156/304.6, 156/309.9, 320–322, 273.3, 272.2; 428/301.4, 428/95; 296/39.3; 264/403, 402, 486, 492, 264/510
See application file for complete search history.

(56) References Cited

U.S. PATENT DOCUMENTS

| | | | |
|---|---|---|---|
| 3,307,990 A | 3/1967 | Homier et al. ................ 156/72 |
| 3,964,850 A | 6/1976 | Carnegie, Jr. ............... 425/292 |
| 4,098,629 A * | 7/1978 | Goldstone .................... 156/285 |
| 4,199,635 A | 4/1980 | Parker .......................... 428/95 |
| 4,428,454 A * | 1/1984 | Capaul et al. ............... 181/290 |
| 4,568,581 A | 2/1986 | Peoples, Jr. .................. 428/35 |
| 4,579,764 A * | 4/1986 | Peoples et al. ............. 264/257 |
| 4,584,157 A * | 4/1986 | Sweig ......................... 264/522 |
| 5,111,579 A | 5/1992 | Andersen ................. 29/897.32 |
| 5,628,859 A | 5/1997 | Janin et al. ............... 156/273.3 |
| 6,133,172 A * | 10/2000 | Sevenish et al. ............ 442/370 |
| 6,631,785 B1 * | 10/2003 | Khambete et al. .......... 181/290 |
| 6,659,223 B1 * | 12/2003 | Allison et al. .............. 181/290 |
| 6,802,389 B1 * | 10/2004 | Tompson et al. ........... 181/290 |
| 2002/0137421 A1 * | 9/2002 | Desroches et al. .......... 264/402 |

OTHER PUBLICATIONS

Copy of International Search Report for PCT/US03/19214.

* cited by examiner

Primary Examiner—Edgardo San Martin
(74) Attorney, Agent, or Firm—Myers Bigel Sibley & Sajovec, P.A.

(57) ABSTRACT

Apparatus and methods are provided forming a sound attenuating laminate that has a decoupler fiber layer and a mass layer in opposing relationship with each other. The decoupler fiber layer and mass layer of the laminate are heated to the selected temperature in substantially the same amount of time via a hot air source and a heated platen, respectively. The heated laminate is conveyed to a mold and formed into a predetermined three-dimensional configuration via the mold.

11 Claims, 2 Drawing Sheets

APPARATUS AND METHODS OF FORMING SOUND ATTENUATING LAMINATES HAVING FIBER AND MASS LAYERS

RELATED APPLICATION

This application claims the benefit of U.S. Provisional Application No. 60/421,914, filed Oct. 29, 2002, the disclosure of which is incorporated herein by reference in its entirety as if set forth fully herein.

FIELD OF THE INVENTION

The present invention relates generally to sound attenuation articles and, more particularly, to methods and apparatus for producing sound attenuation articles.

BACKGROUND OF THE INVENTION

It is generally considered desirable to reduce the level of noise within passenger compartments of vehicles. External noises, such as road noise, engine noise, vibrations, etc., as well as noises emanating from within passenger compartments, may be attenuated through the use of various acoustical materials. Sound attenuating materials for vehicles, such as automobiles, are conventionally used in the dashboard, in conjunction with carpeting for floor panels, in the wheel wells, in the trunk compartment, under the hood, as part of the headliner, A-pillars, etc.

Floor coverings, dash insulators, fender well covers, interior trim components, and the like that are designed to attenuate noise may be formed from a laminate having a thermoplastic mass layer and a decoupler fiber layer attached to the mass layer. A mass layer is conventionally a highly filled thermoplastic material (e.g., ethylene vinyl acetate (EVA) with 80% calcium carbonate, etc.). Other materials may include polyethylene (PE), polyvinylchloride (PVC), etc.). A fiber layer may be a batting of one or more thermoplastic fibers.

Floor coverings, dash insulators, fender well covers, interior trim components, and the like, are conventionally molded into a three dimensional configuration to conform with the contours of a vehicle component to which they are to be attached. A laminate is conventionally pre-heated to a specific temperature prior to molding via forced heated air. Although the fiber layer of the laminate can be heated fairly quickly via the use of force heated air, the mass layer may take a very long time to reach the temperature necessary for molding. This delay may add to manufacturing time, and, thus, may increase costs. As such, vehicle manufacturers are continuously looking for ways to reduce the time and costs associated with manufacturing fiber/mass acoustical parts for vehicles.

SUMMARY OF THE INVENTION

In view of the above discussion, apparatus for producing a sound attenuating laminate that has a decoupler fiber layer and a mass layer in opposing relationship with each other are provided and include an oven that heats the laminate to a selected temperature, a mold that forms the heated laminate into a predetermined three-dimensional shape, and a conveyor operably associated with the oven and mold that is configured to convey the heated laminate between the oven and mold. According to embodiments of the present invention, the oven includes a cavity, a heated platen, and a hot air source. The platen is disposed within the cavity and is configured to receive the mass layer in contacting relationship therewith and heat the mass layer to a selected temperature. The hot air source is disposed within the cavity and is configured to direct heated air at the decoupler fiber layer to heat the decoupler fiber layer to a selected temperature. The hot air source and platen heat the respective decoupler fiber layer and mass layer to the selected temperature in substantially the same amount of time. The mold is configured to form a heated laminate into a predetermined three-dimensional shape.

According to embodiments of the present invention, a method of forming a sound attenuating laminate that has a decoupler fiber layer and a mass layer in opposing relationship with each other, includes heating the laminate to a predetermined temperature, conveying the heated laminate to a mold and forming the heated laminate into a predetermined three-dimensional configuration via the mold. The decoupler fiber layer and mass layer of the laminate are heated to the selected temperature in substantially the same amount of time via a hot air source and a heated platen, respectively.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
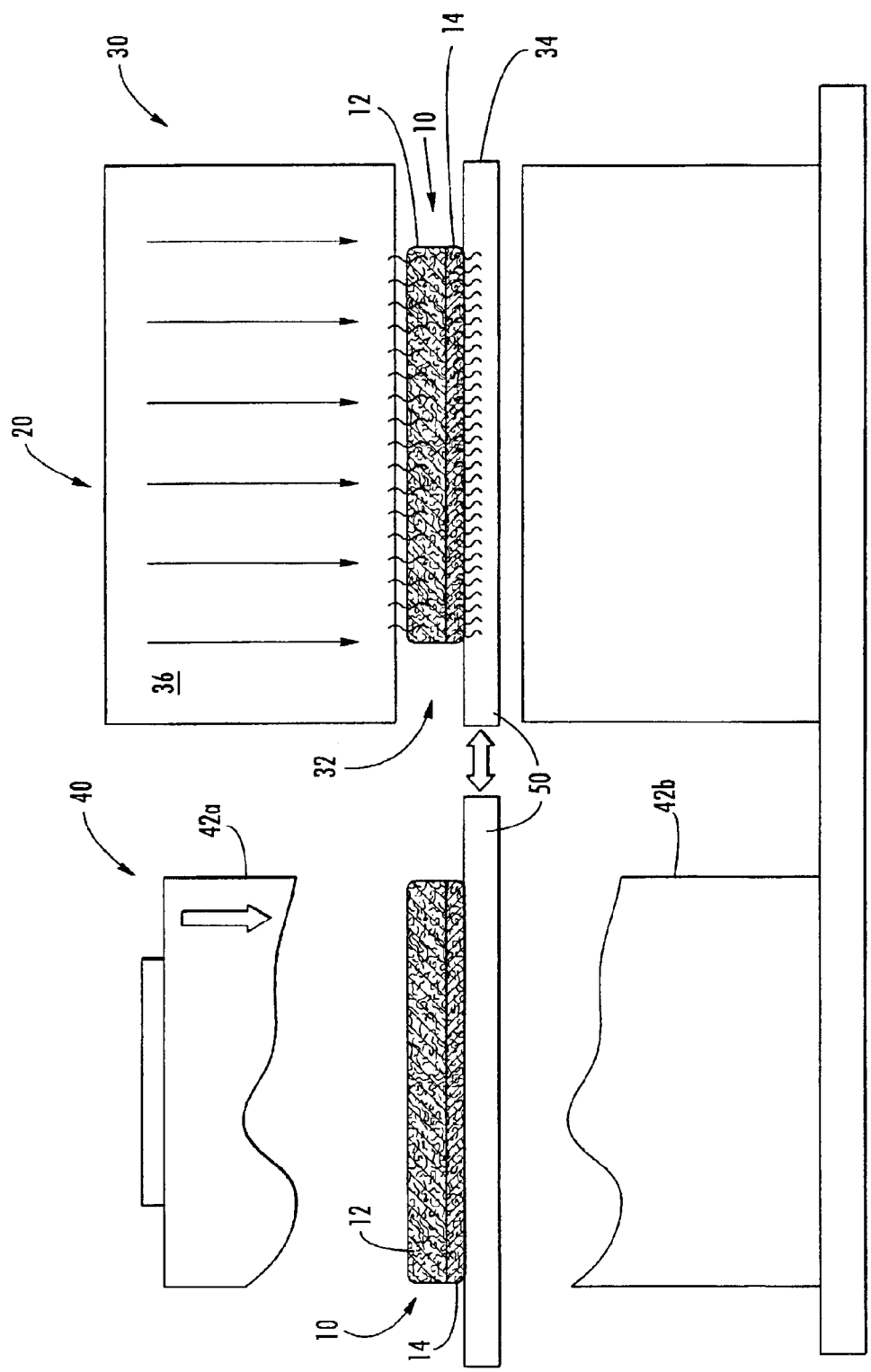
FIG. 1 illustrates an apparatus for rapidly heating and molding a multi-layer sound attenuating structure, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like when used herein are for the purpose of explanation only.

Embodiments of the present invention provide sound attenuating and/or absorbing laminates for use in various applications, particularly automotive applications. Exemplary automotive applications within which sound attenuating and/or absorbing laminates may be utilized include, but are not limited to, floor coverings, door panels, dash insulators, trunk liners headliners, various interior trim components, wheel well liners, etc.

FIG. 1 illustrates an apparatus 20 for producing a sound attenuating laminate 10 for a vehicle, according to embodiments of the present invention. The laminate 10 has a fiber layer 12 and a mass layer 14 in opposing relationship with each other. The fiber layer 12 is a fibrous batting of thermoformable material including those derived from natural and/or synthetic fibers. The mass layer 14 is a relatively dense material, normally impermeable to air and thermoformable. Mass layer 14 can be formed from virtually any plastic or rubber material which contains a high-mass filler material. An exemplary mass layer includes ethylene vinyl acetate (EVA), polyethylene (PE), or polyvinylchloride (PVC), along with a high-mass filler material, such as glass, calcium carbonate or barium sulfate, added to increase the mass.

The illustrated apparatus 20 includes an oven 30, mold 40 and conveyor 50 operably associated with the oven 30 and mold 40. The oven 30 is configured to rapidly heat the laminate 10 to a selected temperature and includes a cavity 32, a platen 34 and a hot air source 36, each operably associated with the cavity 32. Alternatively, the oven 30 may include an infrared radiation source that may be used alone or in conjunction with the hot air source 36 to rapidly heat laminate 10.

The platen 34 is configured to be heated to one or more selected temperatures and is configured to receive the laminate mass layer 14 in contacting relationship therewith. The platen 34 may be formed from various materials known to those skilled in the art, including, but not limited to, aluminum, steel, and other thermally conductive metals and materials. The hot air source 36 is configured to direct heated air at the laminate decoupler layer 12. In the illustrated embodiment, the platen 34 and hot air source 36 are positioned diametrically opposite from each other within the oven 30. However, it is understood that the relative positions of the platen 34 and hot air source 36 may be reversed. For example, the platen 34 may be positioned on top and the hot air source 36 may be positioned on the bottom. The platen 34 may have various shapes, sizes and configurations.

The platen 34 may have a contoured shape or may be substantially flat. Moreover, multiple platens 34 may be utilized. The hot air source 36 may include multiple hot air sources. In addition, hot air may be directed towards a laminate via various types of ducts and nozzles.

The platen 34 is capable of heating the mass layer 14 to a predetermined temperature in about the same time as required to heat the fiber decoupler layer 12 via the hot air source 36. Heating the mass layer 14 via hot air in a conventional oven would require a much longer time to bring the mass layer 34 to the required temperature for molding. Thus, this combination of heated platen 34 and hot air source 36 (or alternatively, infrared radiation) facilitates rapid and efficient heating of the laminate 10.

The mold 40 is configured to form the laminate 10, after being heated via the oven 30, into a predetermined three-dimensional shape. The illustrated mold 40 includes upper and lower mold halves 42a, 42b. Molds are well understood by those skilled in the art and need not be described further herein. The illustrated conveyor 50 is configured to convey a heated laminate from the oven 30 to the mold 40. The conveyor 50 may be any kind of transport device that is capable of transporting a heated laminate from the oven 30 to the mold 40.

Figure 2:
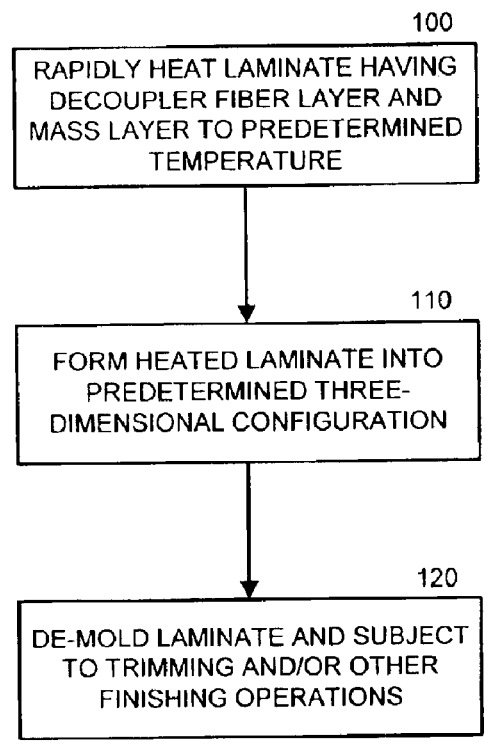
FIGS. 2–3 illustrate operations for forming a sound attenuating laminate according to embodiments of the present invention.
Figure 3:
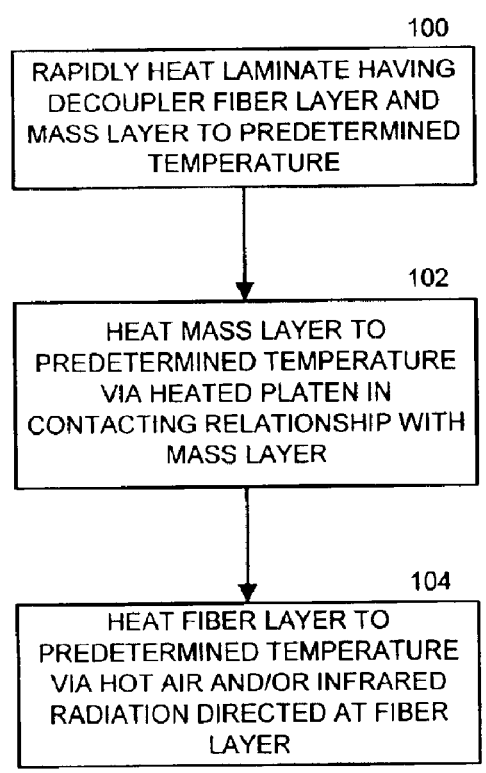

FIGS. 2–3 illustrate operations for forming a sound attenuating laminate according to embodiments of the present invention. A laminate having a decoupler fiber layer and a mass layer in opposing relationship with each other is rapidly heated to a required temperature (Block 100). This includes heating the mass layer to the predetermined temperature via a heated platen in contacting relationship with the mass layer (Block 102) and heating the fiber layer to the predetermined temperature via hot air (and/or infrared radiation) directed at the fiber layer (Block 104). The heated laminate is then conveyed to a mold and formed into a predetermined three-dimensional configuration via a mold (Block 110). As understood by those skilled in the art, the heated laminate is subjected to conditions within the mold (e.g., pressure and/or temperature) sufficient to produce a sound attenuating laminate having a desired shape and having a surface with the desired appearance formed thereon. After molding operations, the sound attenuating laminate 10 is de-molded and subjected to trimming and/or other finishing operations (Block 120).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An oven for rapidly heating a sound attenuating laminate that has a decoupler fiber layer and a mass layer in opposing relationship with each other, the oven comprising:
    a cavity;
    a platen disposed within the cavity that can be heated to a selected temperature, wherein the platen is configured to receive the mass layer in contacting relationship therewith; and
    a hot air source disposed within the cavity, wherein the hot air source is configured to direct heated air at the decoupler fiber layer;
    wherein the hot air source and platen heat the respective decoupler fiber layer and mass layer to the selected temperature in substantially the same amount of time.

2. The oven of claim 1, wherein the platen and hot air source are positioned diametrically opposite from each other relative to the cavity.

3. The oven of claim 1, wherein the platen comprises aluminum.

4. An apparatus for producing a sound attenuating laminate that has a decoupler fiber layer and a mass layer in opposing relationship with each other, the apparatus comprising:
    an oven that heats the laminate to a selected temperature, comprising:
        a cavity;
        a platen disposed within the cavity that can be heated to a selected temperature, wherein the platen is configured to receive the mass layer in contacting relationship therewith; and
        a hot air source disposed within the cavity, wherein the hot air source is configured to direct heated air at the decoupler fiber layer;
        wherein the hot air source and platen heat the respective decoupler fiber layer and mass layer to the selected temperature in substantially the same amount of time; and a mold that forms a heated laminate into a predetermined three-dimensional shape.

5. The apparatus of claim 4, further comprising a conveyor operably associated with the oven and mold that is configured to convey a heated laminate between the oven and mold.

6. The apparatus of claim 4, wherein the platen and hot air source are positioned diametrically opposite from each other relative to the cavity.

7. The apparatus of claim 4, wherein the platen comprises aluminum.

8. A method of forming a sound attenuating laminate that has a decoupler fiber layer and a mass layer in opposing relationship with each other, the method comprising:
   heating the laminate to a predetermined temperature, comprising:
      heating the mass layer to the predetermined temperature via a heated platen in contacting relationship with the mass layer; and
      heating the fiber layer to the predetermined temperature by directing hot air at the fiber layer;
      wherein the decoupler fiber layer and mass layer are heated to the selected temperature in substantially the same amount of time;
   conveying the heated laminate to a mold; and
   forming the heated laminate into a predetermined three-dimensional configuration via the mold.

9. The method of claim 8, further comprising removing the laminate from the mold and subjecting to one or more finishing operations.

10. A method of forming a sound attenuating laminate that has a decoupler fiber layer and a mass layer in opposing relationship with each other, the method comprising:
    heating the laminate to a predetermined temperature, comprising:
       heating the mass layer to the predetermined temperature via a heated platen in contacting relationship with the mass layer; and
       heating the fiber layer to the predetermined temperature by directing infrared radiation at the fiber layer;
       wherein the decoupler fiber layer and mass layer are heated to the selected temperature in substantially the same amount of time;
    conveying the heated laminate to a mold; and
    forming the heated laminate into a predetermined three-dimensional configuration via the mold.

11. The method of claim 10, further comprising removing the laminate from the mold and subjecting to one or more finishing operations.

* * * * *